No. 760,941. PATENTED MAY 24, 1904.
C. C. WILSON.
ORE TREATING FURNACE.
APPLICATION FILED AUG. 18, 1903.
NO MODEL. 6 SHEETS—SHEET 1.

No. 760,941. PATENTED MAY 24, 1904.
C. C. WILSON.
ORE TREATING FURNACE.
APPLICATION FILED AUG. 18, 1903.
NO MODEL. 6 SHEETS—SHEET 3.

No. 760,941. PATENTED MAY 24, 1904.
C. C. WILSON.
ORE TREATING FURNACE.
APPLICATION FILED AUG. 18, 1903.
NO MODEL. 6 SHEETS—SHEET 4.

Witnesses:
G. Sargent Elliott.
John E. Wightman

Inventor
Christopher C. Wilson,
By
H. S. Bailey, Attorney.

No. 760,941. PATENTED MAY 24, 1904.
C. C. WILSON.
ORE TREATING FURNACE.
APPLICATION FILED AUG. 18, 1903.
NO MODEL. 6 SHEETS—SHEET 6.

No. 760,941. Patented May 24, 1904.

UNITED STATES PATENT OFFICE.

CHRISTOPHER C. WILSON, OF DENVER, COLORADO.

ORE-TREATING FURNACE.

SPECIFICATION forming part of Letters Patent No. 760,941, dated May 24, 1904.

Application filed August 18, 1903. Serial No. 169,931. (No model.)

*To all whom it may concern:*

Be it known that I, CHRISTOPHER C. WILSON, a citizen of the United States of America, residing in the city and county of Denver and State of Colorado, have invented certain new and useful Improvements in Ore-Treating Furnaces; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in ore-treating furnaces; and the objects of my invention are, first, to provide a revoluble cylindrical ore-roasting and automatic ore feeding and rabbling furnace; second, to provide a new and novel device for feeding ore into my improved ore-roasting furnace; third, to provide a new and novel means for automatically and coöperatingly feeding ore through said furnace and for rabbling it at the same time that it is feeding through said furnace; fourth, to provide means for introducing either hot or cold air into either or both ends of said furnace either at the same or at different times either continuously or intermittently; fifth, to provide means for introducing either hot or cold air into the discharge end of said furnace and for preventing it from flowing beyond a predetermined distance and for practically confining it to the discharge end of said furnace; sixth, to provide a revoluble cylindrical furnace in which the ore as it feeds through it is muffled against the products of combustion, and, seventh, to provide a furnace in which the ore is rabbled and fed through it and allowed to continuously fall through the hot air or cold air or steam or superheated steam in spray-like streams. I attain these objects by the mechanism illustrated in the accompanying drawings, in which—

Similar characters of reference refer to similar parts throughout the several views.

Figures 1, 13:
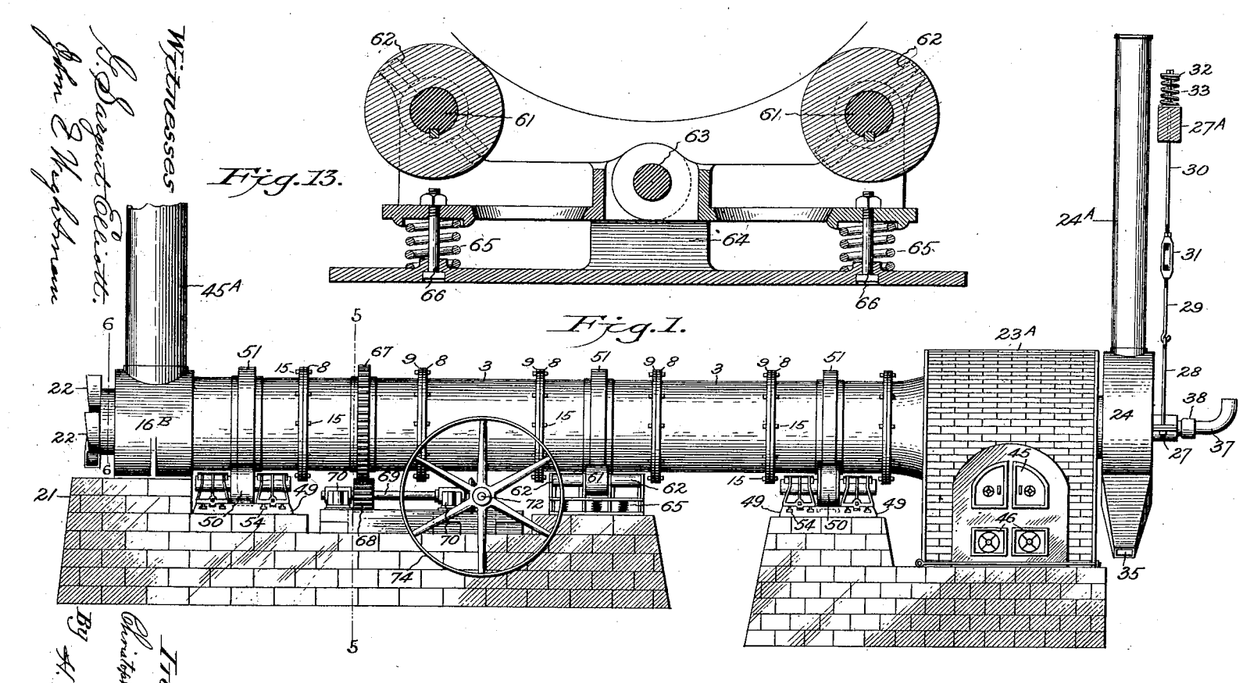
Figure 1 represents a side elevation of a furnace embodying my invention.
Fig. 13 represents a yielding roller-support I employ for supporting the center of the furnace.
Figures 4, 11, 12:
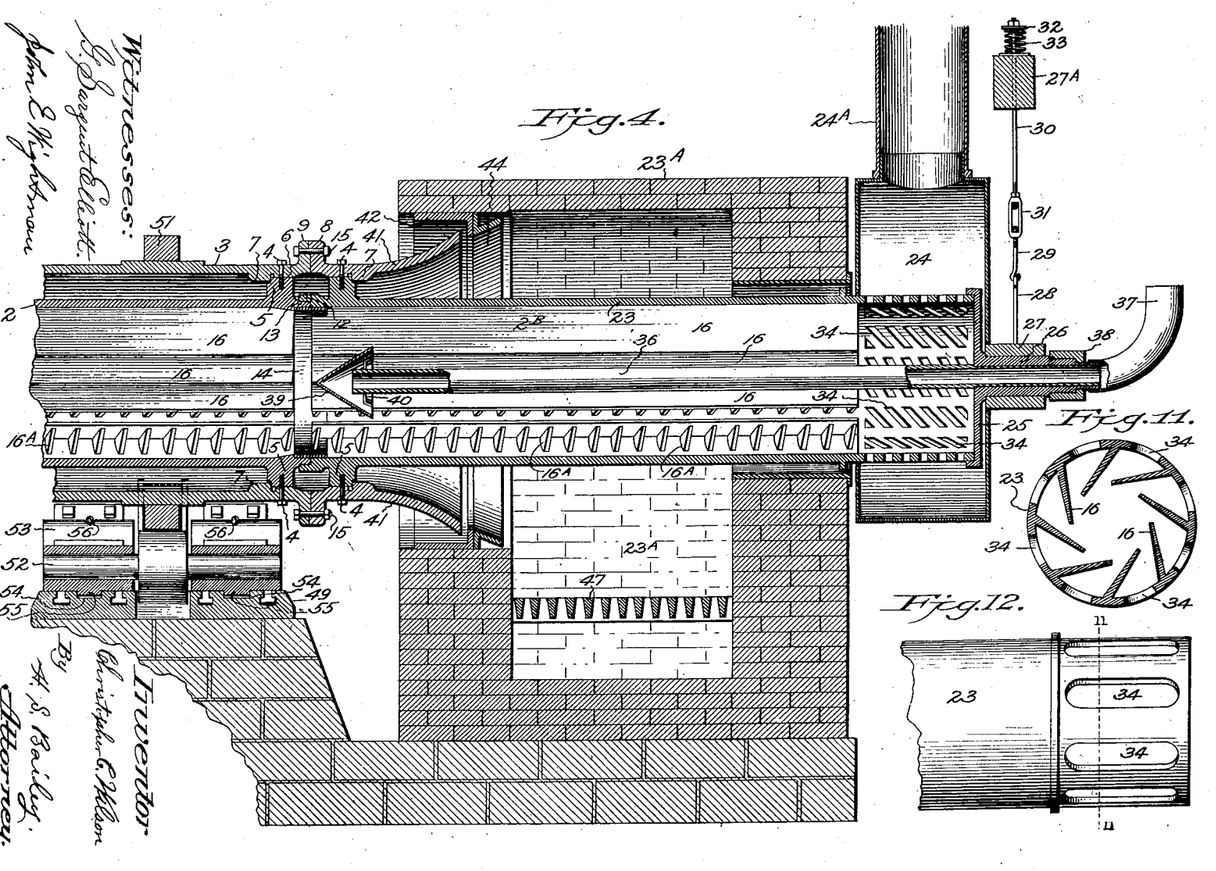
Fig. 4 represents a longitudinal sectional fragment of the discharge-end portion of my improved furnace.
Fig. 11 represents a section of Fig. 12.
Fig. 12 represents a fragment of the discharge end of the ore-roasting cylinder, showing a different-shaped discharge-aperture and internal arrangement of the discharge end of the ore-roasting cylinder from that illustrated in Fig. 4.
Figure 9:
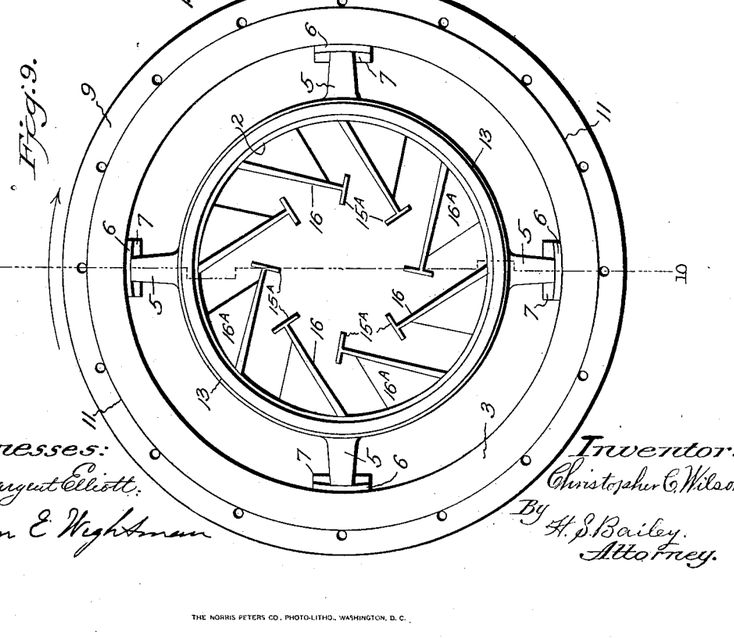
Fig. 9 represents an end elevation of a section of my furnace.
Figure 10:
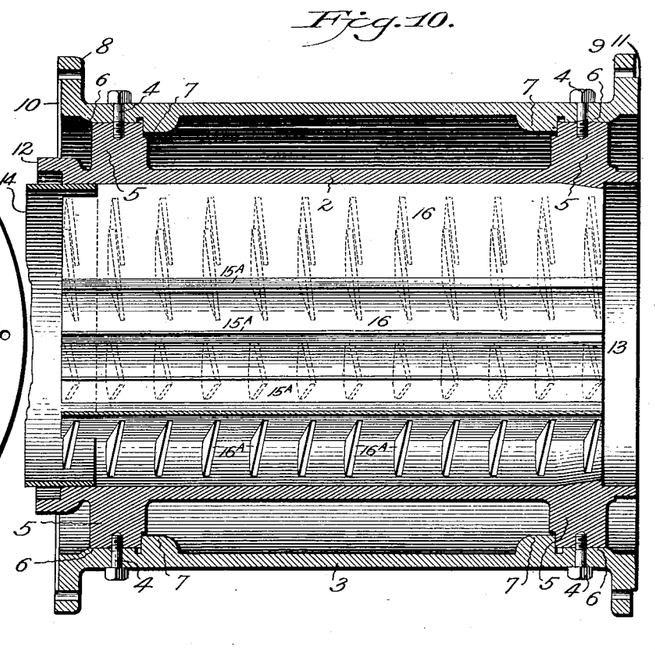
Fig. 10 represents a longitudinal sectional view of a section of my furnace and of Fig. 9 on line 10 10.

Referring to Fig. 1 of the drawings, it can be seen that my furnace is several times longer than its diameter, and in order to facilitate the shipment of the furnace I divide the cylinders into sections of convenient length to be easily put together and handled, as shown in Figs. 9 and 10. Each of these sections preferably comprises an inner cylinder 2, which I term the "ore-roasting" cylinder, and an outer cylinder 3, which I term the "flue-cylinder." These two cylinders are detachably secured together, preferably by bolts 4, which extend loosely through the outer shell into arms 5, which are formed integral with the ore-roasting cylinder and project from it to the inner periphery of the flue-cylinder, where they rest on bosses 6 and abut against lugs 7, that are formed on the inner periphery of the flue-cylinder. Four of these arms are preferably used at equidistant points around the periphery of the ore-roasting cylinder. The opposite ends of each section except at the extreme end sections of the furnace are provided with flanges 8 and 9. One end is provided with a slight stepped recess 10 and the opposite end with a slight projecting step 11, which fits into similar but oppositely-arranged parts on the ends of the other sections of the furnace. The opposite ends of the ore-roasting cylinder are provided with an overlapping joint, which consists of a projecting ring portion 12 at one end and of a counterbored ring portion 13 at the opposite end, which is adapted to receive the projecting ring portion 12 of an adjacent section. I preferably cover the joint between the overlapping sections of the ore-roasting sections with a ring 14, which is adapted to fit the inner periphery of the ore-roasting cylinder and to extend substantially an equal distance from the joint into each cylinder. The sections of the ore-treating cylinder are thus connected together by this overlapping joint and the ring, while the sections of the flue-cylinder are bolted together through their flanges by the bolts 15. The inner periphery of the ore-roasting cylinder is provided with a plurality of rabbling devices spaced equidistantly apart. These rabbling devices comprise a plurality of shelves 16, formed integral with or connected to the inner periphery of the ore-roasting cylinder. I preferably arrange these shelves throughout the length of each section of the ore-roasting cylinder of the furnace except for a short distance at the discharge end of the discharge section of the furnace, as shown in Fig. 4, where they terminate at the beginning of the ore-discharging apertures of this section. I preferably arrange these shelves parallel with the longitudinal axis of the cylinder and arrange them to project tangentially from the inner periphery of the ore-roasting cylinder on an acute angle of substantially about thirty degrees to the arc of the inner periphery of the cylinder. These shelves are of equal lengths and extend a predetermined distance across the area of the cylinder, each shelf being preferably arranged to extend from its head end or point of connection to the cylinder to the diametrical plane of the shelf adjacent to it. This arrangement allows each one of the shelves an equal amount of room and leaves a central or axial circular space throughout the length of each section and of the furnace. Upon one side of each shelf I arrange at short distances apart right-angular-shaped plates 16$^A$, which extend from close to the free end of each shelf back to the inner periphery of the cylinder. These plates are preferably positioned to stand at a slight spiral angle or pitch to the longitudinal axis of the cylinder from the feed end and are adapted to divide one side of the shelves into numerous pockets, that fill with ore as the cylinder revolves and carry it up and around the top of the cylinder and discharge it in a thin broad stream slowly and owing to their inclination to the longitudinal axis of the cylinder forward of the point in the cylinder where they pick the ore up. Thus they form a positive forward feed for the ore through the furnace, as well as effective rabblers of the ore. While I have illustrated these shelves in most of the figures of the drawings with an unobstructive discharging edge which may be used, if desired, for coarsely-pulverized ores that roast quickly, I preferably place a right-angled partition, dam, or apron 15$^A$ along the free discharge edge of each shelf, as shown in Figs. 9 and 10, which I preferably arrange to project high enough on the pocket side of the shelf to hold the contents of the pockets back long enough to pass over the top vertical center of the cylinder and then discharge gradually onto the back side of the adjacent lower shelf, and I preferably make this partition to project higher above the pocketless side of each shelf than on the pocket side, so that when the ore discharges from the pockets against the pocketless side of the shelves this deeper partition will hold it from sliding into the bottom of the cylinder and will keep most of it on the shelf, and it will slide back against the inner periphery of the cylinder's shell as the cylinder rotates and then slides back into the pockets again after they pass their lower vertical center and is then carried over the top vertical center again. These edge partitions or dams in a large measure prevent the dusting of finely-pulverized ore and at the same time confine the ore close to the periphery of the cylinder, where the greatest heat is. The feed-end section of the ore-roasting cylinder extends beyond the section of the flue-cylinder through and beyond a smoke-chamber 16$^B$, and the end section 17, which is the ore-feeding end of the furnace, is provided with a head 18, through the center of which a pipe 19 extends a short distance. This pipe also projects from the head a short distance, and its outer end is adapted to be connected to a supply-pipe leading to a supply of hot or cold air or steam or superheated steam. A semicircular-shaped trough or hopper 20, which rests on a suitable foundation 21, is arranged to inclose the lower half of the end of the ore-roasting furnace, and the projecting end of the pipe 19 extends from the head of the cylinder through this hopper. To the head of the end section 17 of the ore-roasting cylinder I secure a plurality of semicircular-shaped tapering spiral ore-feeding spouts 22. These ore-feeding spouts are arranged in a circle round the center of the head of the cylinder. Their entrance ends are the largest and are arranged to scoop up the ore as they rotate through the hopper. From their entrance ends they taper to their discharge ends, which are spirally curved inwardly and extend through the head close to the pipe 19. The discharge-end section $2^B$ of the ore-roasting cylinder also projects beyond the flue-cylinder and extends through a combustion-chamber $23^A$ and enters a discharge-hood 24, the top of which is provided with a stack $24^A$ for the escape of the sulfur and other gases. The extreme end of the cylinder is provided with a head 25, which is detachably secured to its end. This head 25 is provided with a journal-hub portion 26, which projects through the outer shell of the hood. A box 27 is mounted on the journal of the hub and is adjustably supported from an overhead timber $27^A$ by rods 28, 29, and 30. A turnbuckle 31 connects rods 29 and 30, and the adjacent ends of the rods 28 and 29 are connected together by interlinking eyes. The box is secured to the ends of the rod 28 by a thread-and-nut connection. The upper end of the rod passes through and extends above the timber $27^A$, and their ends are threaded and provided with a nut. A washer 32 is placed below the nut, and around the rod between the washer and the timber a coiled spring 33 is placed. This end of the ore-roasting cylinder is thus yieldingly supported and is free to expand and contract as it rotates without straining its roller-bearing supports or the joints between its sections. That portion of the end section 23 that projects into the discharge-hood is provided with a plurality of apertures 34, through which the roasted ore discharges into the hood, which is provided with a discharge-spout 35, that depends from its bottom portion. The ore-discharging apertures 34 are formed through the shell of the cylinder and may be of any suitable shape or size or arrangement, Figs. 4, 11, 12, and 18 showing two different arrangements of these ore-discharging apertures. The journal-hub of the head end of the ore-discharge section of the ore-roasting cylinder is hollow, and a pipe 36 extends loosely through the journal-hub. An elbow 37 and coupling 38 are attached to the end of the pipe, and the coupling fits loosely on a reduced portion on the end of the hub of the cylinder. This pipe extends axially through the center of the end section 23 to close to its opposite end, where it terminates inside of a longitudinally-arranged cone 39, which is supported by a spider 40, that extends across the base of the cone, the hub portion of which is secured to the pipe adjacent to its end. This pipe is adapted to convey either hot or cold air under slight pressure or steam or superheated steam from suitable sources of supply into the inner end of the discharge-end section of the ore-roasting cylinder, where it is diverted back by the cone and falls through the falling ore, oxidizing it as it flows to the discharge-apertures of the cylinder.

Figures 5, 6, 7:
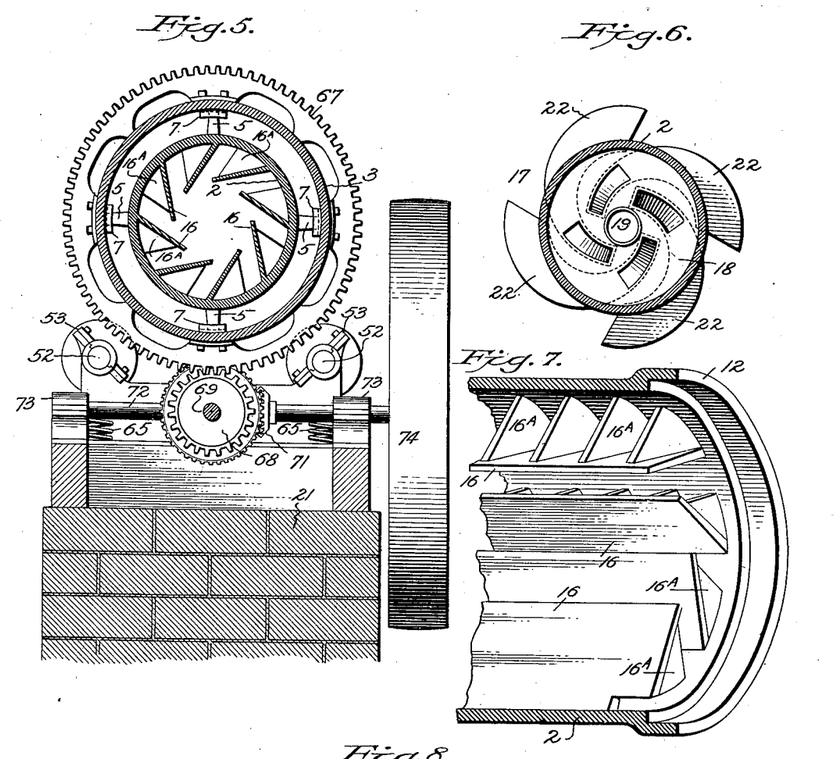
Fig. 5 represents a section of Fig. 1 on line 5 5.
Fig. 6 represents a section of Fig. 1 on line 6 6.
Fig. 7 represents a fragmentary perspective view of one end of one section of my furnace, showing the angular-pitched buckets or scoops I employ to pick up the ore and discharge it forwardly in a thin stream, thus feeding it continuously through the furnace and rabbling it at the same time.
Figure 8:
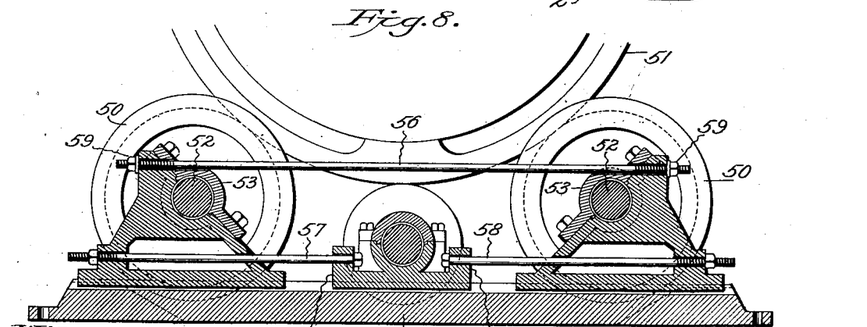
Fig. 8 represents a sectional view of the base-plate and the adjustable rollers upon which my furnace rests and rotates.
Figure 18:
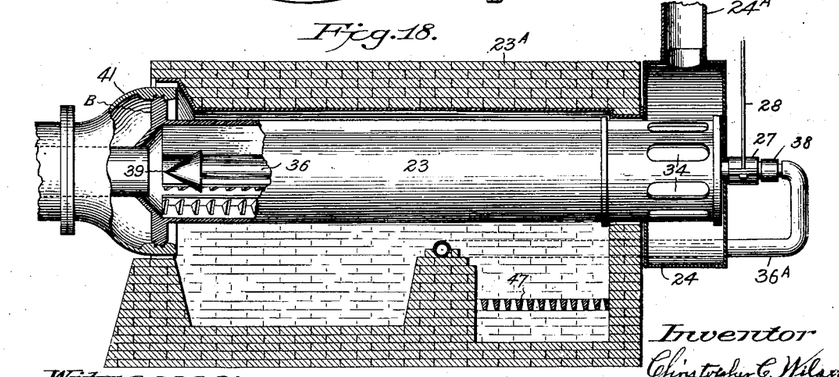
Fig. 18 is a sectional view illustrating a modification of the discharge end of the furnace.

In Fig. 18 I illustrate a slight modification in the relative proportions of the ore-discharging section of the ore-roasting cylinder and the adjacent sections of the furnace. In this arrangement I make the discharge-section 23 much larger in diameter than the rest of the sections of the ore-roasting cylinder and also preferably longer. I also make the combustion-chamber $23^A$ longer, extending its inner end to substantially the inner end of the enlarged portion of the end section, and I also surround the inner end of the end section with a bell or cone shaped terminal flue-section, that is bolted to the end of the adjacent flue-section and that surrounds the enlarged inner end of the discharge-section and is supported also by radial arms B, projecting from the inner end portion of the ore-roasting end section to the inner periphery of the large entrance end. The end of the ore-discharging section that connects to the end of the adjacent ore-roasting section is of the same diameter as the remainder of the ore-roasting sections, but is enlarged close to this joint throughout the remainder of its length. The object of this enlargement is to give increased ore-roasting and oxidizing surface at the last part of the roast, as the enlarged surfaces tend to thin the ore out into thinner stratas, while the fresh air or steam in increased volume more thoroughly oxidizes the ore than in the smaller discharge-section. The air or steam inlet pipe $36^A$ in the view is shown extending into the brickwork of the furnace and across the bridge, from which it extends to a suitable blower or to a source of steam or superheated-steam supply. Otherwise the arrangement of this discharge end section 23 is similar to that illustrated in the other views. The flue-cylinder terminates in a conical end piece 41 at the discharge end of the furnace, that projects into the brickwork of the combustion-chamber 23 and inside of a right-angled ring 42. This ring 42 supports the outer part of the arch of the brickwork, and at the side of the ring a conical ring 44 is placed which supports the inner portion of the arch of the brickwork. This conical ring directs the products of combustion into the conical end of the flue-cylinder, which is secured to the arms of the ore-roasting clyinder by bolts the same as the other flue-sections. The combustion-chamber $23^A$ is constructed of brick and is provided with fire and ash-pit doors 45 and 46, repectively, and with grate-bars 47. The opposite end of the flue-cylinder terminates in a short section that projects over a part of the length of the ore-feed end section and extends into the smoke-stack chamber 16ᴮ a short distance, this smoke-chamber comprising a hollow casting that rests on a suitable foundation of brick or stone. A smoke-stack 45ᴬ projects upward from a flanged aperture in its top. In Figs. 1 and 7 sections are illustrated and are preferably used in a furnace, and these sections may be made from four to six feet long and from twenty-four inches to six feet in diameter, depending on the capacity required.

The furnace is supported on rollers 50, which are supported in a bearing-block 49, which rests on a suitable foundation. I preferably support the furnace on three sets of rollers, one set being placed near each end of the flue-cylinder, and then place a yielding set of supporting-rollers in the center to support the center. I consequently provide the flue-section adjacent to the conical flue-section and also the center section and the opposite end section with a tread-ring 51, which rests on the rollers. The rollers of the end tread-rings are mounted on shafts 52, that are journaled in boxes 53, that are adjustable lengthwise of their bed-plates in slots 54, formed in them, in which lugs 55, formed on the boxes, extend. I preferably employ three sets of rollers under the end tread-rings, and their boxes are connected together by rods 56 and bolts 57 and 58. The rod 56 extends loosely through apertures in the top of the boxes, and its ends are threaded and provided with nuts 59. The bolts 57 and 58 extend loosely through ears 60, formed on the center box, and extend loosely through the lower portion of the end boxes, against which their nuts bear. The three rollers can thus be adjusted to or from each other independently of their bearing-block.

The center roller-support for the furnace consists of two rollers which are mounted on shafts 61. These shafts are each journaled in boxes 62, that form an integral part of a pair of arms, and the two pairs of arms are pivotally hinged together by a pin 63, which extends through ears 64, that project upward from the bearing-plate above which they are positioned and are normally held by coiled springs 65, which are held in place under and between the arms and the bearing-block by bolts 66, which pass through the bearing-block and arms and adjust the tension of the springs. This arrangement permits the furnace to rest solidly on the end rollers while permitting the center of the furnace to adjust itself on the yielding rollers as the ends settle.

The furnace is preferably rotated by means of a large driving-wheel 67, that surrounds and is attached to the flue-cylinder, and a pinion 68. The pinion is mounted on a shaft 69, which is supported in boxes 70, that are secured to the foundation. A bevel-gear is secured to the opposite end of the shaft and meshes with a bevel-pinion 71, that is secured on one end of a shaft 72, that is journaled at right angles to the shaft 69 in boxes 73. A pulley 74 is secured to the opposite end of the shaft 72, which is connected by a belt to a suitable source of power.

Figure 2:
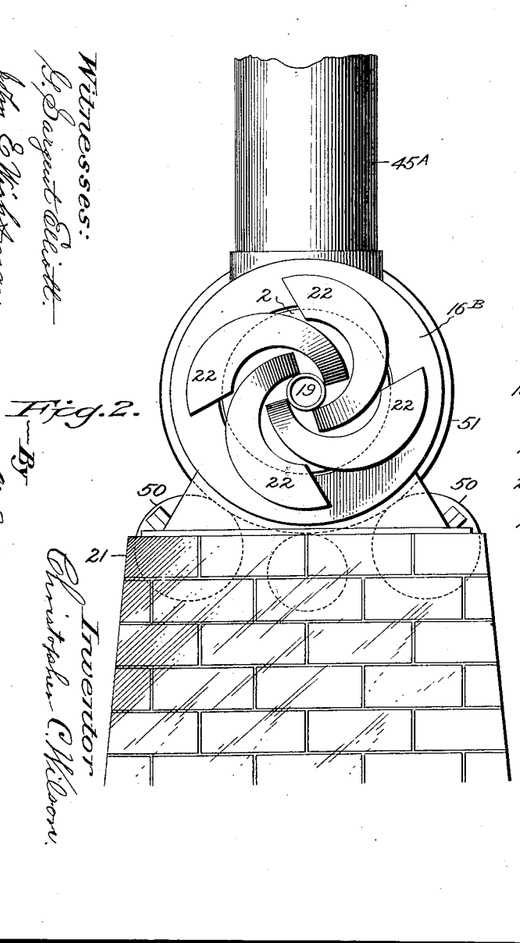
Fig. 2 represents an end elevation of the feed end.
Figure 3:
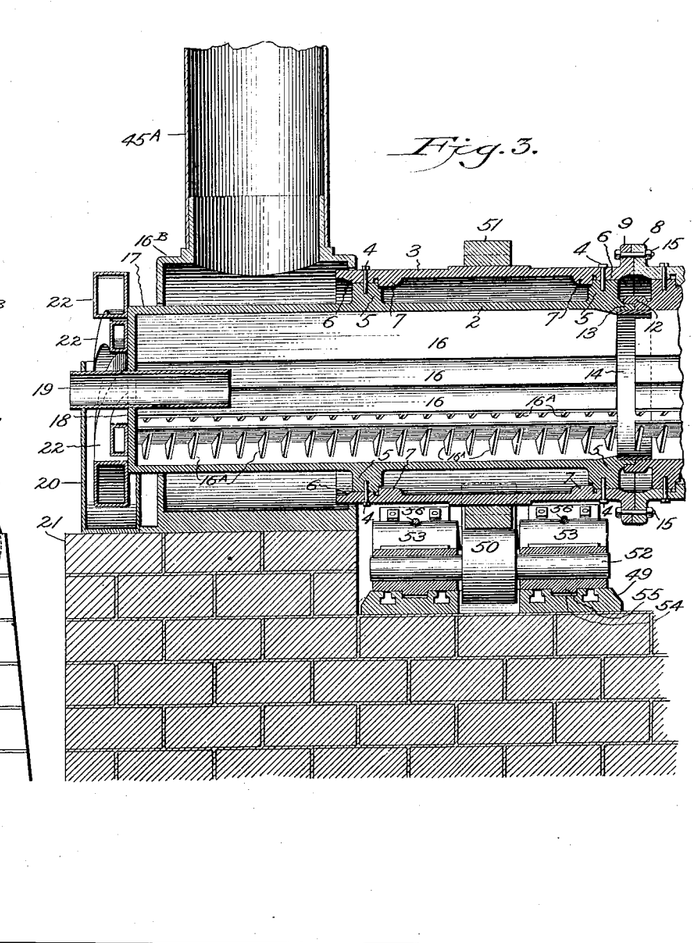
Fig. 3 represents a longitudinal sectional fragment of the ore-feeding end portion of my improved furnace.
Figure 14:
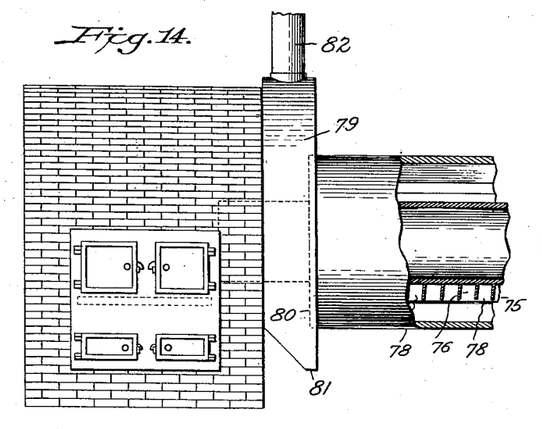
Fig. 14 represents a fragmentary side view, partly in section, of a modified form of my furnace, showing a central fire-flue.
Figure 15:
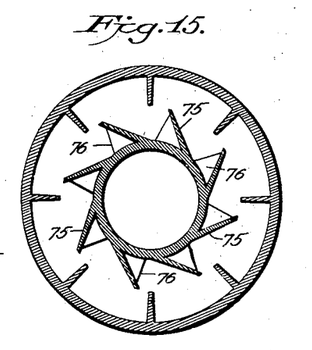
Fig. 15 is a transverse sectional view through the same.

In Figs. 14 and 15 I illustrate a modification of my improved ore-roasting furnace. In Fig. 14 a fragment of the end of the furnace that contains the combustion-chamber is shown, and in Fig. 15 a cross-section of the cylinder is shown. The combustion-chamber is similar to the one shown in Fig. 1, and two cylinders are employed which are connected together the same as in the preferred construction. I reverse the position of the flue and of the ore-roasting chamber of the furnace by using the interior of the small cylinder for the flue and the annular space between the small flue and the larger surrounding cylinder for the ore-roasting chamber. This I accomplish in the following manner: The small flue extends into the combustion-chamber, as shown by the dotted lines, and the products of combustion pass into it and flow through it to the opposite end, which is the ore-feeding end of the furnace, (shown in Figs. 2 and 3,) no change being made in the ore-feeding end except to rearrange the center cylinder to discharge into the smoke-chamber and to arrange the outer flue so that ore can be fed into it. In this modification I preferably provide the inner periphery of the outer cylinder with a plurality of radial introverted shelves which extend through the sections and furnace, and they may be arranged either parallel with the axis of the cylinder or in a spiral curve around it. They extend only part way to the periphery of the inner cylinder. I also provide the periphery of the inner cylinder with a plurality of tangential projecting shelves 75, which also extend through the sections and furnace either straight or spirally. On one side of these shelves there are at short distances apart vertical partition-plates 76, which are in construction, arrangement, and operation similar to the partitions shown in Figs. 3, 4, 5, 6, 9, and 10 and form a series of spirally-inclined pockets 78 on the shelves. As these cylinders rotate the shelves on the outer cylinder carry the ore up and discharge it into the pockets 78, which carry it over the top of the inner or (in this case) the flue cylinder, bringing it in contact with the heat, and as the pockets rotate the ore drops to the inner periphery of the cylinder against the shelves; but owing to their transverse pitch to the axis of the cylinders they discharge the ore forward of the point where they received it from the shelves, thus feeding it through the furnace, and when the ore reaches the combustion-chamber end of the furnace discharges it into the hood 79, where the outer cylinder terminates, as indicated by the dotted line 80, from which it discharges out of the spout portion of the hood 81. A stack 82 is placed in the top of the hood to carry off the sulfur and other gases arising from the ore.

Figure 16:
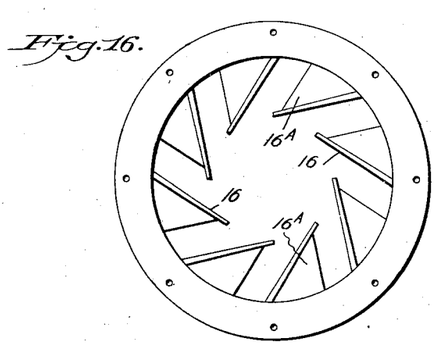
Fig. 16 is an end view illustrating a further modification in which a single cylinder is used, the inner periphery of which is provided with the angular-pitched buckets, the heat being adapted to pass through the cylinder in direct contact with the ore.
Figure 17:
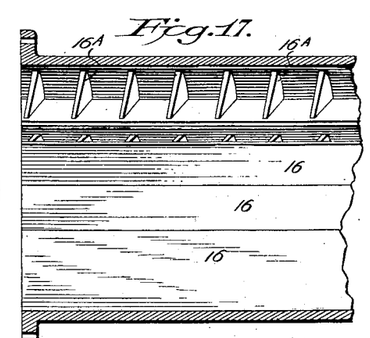
Fig. 17 is a longitudinal sectional view of the same.

In Figs. 16 and 17 I show another modification of the arrangement of the ore-roasting part and of the ore feeding and rabbling device of my furnace. In this modification but one cylinder is used. This is provided with a combustion-chamber and smoke-stack and roller-supporting bearings, the same as in the preferred construction; but the products of combustion and also the ore travel together through this one cylinder. The ore feeding and rabbling device is the same in this one cylinder as shown and described in Figs. 3, 4, 5, 7, 9, and 10.

The operation is as follows: My improved furnace requires only a low degree of heat, which may vary with the character of the ore from 500° to 1,000° Fahrenheit. The furnace is rotated slowly, and the heat and products of combustion flow from the grates in the combustion-chamber through the flue-cylinder, completely surrounding the ore-roasting cylinder and flowing to the smoke-chamber and out of the smoke-stack. The ore, which must be perfectly dry, is fed into the hopper after having first been pulverized to from about twenty to eighty mesh, and as the furnace rotates the semicircular spouts fill with it, and as they rotate up over their vertical centers the ore runs down them into the ore-roasting cylinder and is fed through the cylinder by the shelves and their pockets and thoroughly rabbled. Either cold air or hot air or steam or superheated steam is used as the oxidizing agent and is fed constantly into both ends of the furnace in sufficient volume to thoroughly oxidize the ore. When the ore reaches the discharge end of the furnace, it discharges through the apertures in the end-section into the hood, from which it discharges and is conveyed to tanks for treatment in cyanid solutions or to other treatment for the recovery of its values.

My furnace is simple and durable in construction and will roast ore at a very small cost per ton.

Having described my invention, what I claim as new, and desire to secure by Letters Patent, is—

1. In an ore-roasting furnace, a revoluble ore-roasting chamber, and longitudinal shelves projecting from the walls of said chamber, said shelves constructed to cause the ore to drop from shelf to shelf and to move inwardly and outwardly on the opposite sides of each shelf, substantially as described.

2. In an ore-roasting furnace, a revoluble ore-roasting chamber, longitudinal shelves projecting from the walls of said chamber, said shelves constructed to cause the ore to drop from shelf to shelf and to move inwardly and outwardly on the opposite sides of each shelf, and means for feeding the ore through said chamber, substantially as described.

3. In an ore-roasting furnace, a revoluble ore-roasting chamber, longitudinal shelves projecting from the walls of said chamber, said shelves constructed to cause the ore to drop from shelf to shelf and to move inwardly and outwardly on the opposite sides of each shelf, and means for feeding the ore through said chamber as it drops from shelf to shelf, substantially as described.

4. In an ore-roasting furnace, a revoluble ore-roasting chamber, and longitudinal shelves projecting from the walls of said chamber, each shelf having a marginal dam or ledge, and the shelves being arranged to cause the ore to drop from shelf to shelf and to move inwardly and outwardly on the opposite sides of each shelf, substantially as described.

5. In an ore-roasting furnace, a revoluble ore-roasting chamber, and longitudinal shelves projecting from the walls of said chamber, each shelf having a marginal dam extending above and below said shelf, substantially as described.

6. In an ore-roasting furnace the combination with a combustion-chamber and a smoke-stack, of a flue-cylinder rotatably mounted and operatively connected to said combustion-chamber and stack, an ore-roasting cylinder of smaller diameter than said flue-cylinder secured within said flue-cylinder and a plurality of shelves projecting tangentially inwardly from the inner periphery of said ore-roasting cylinder provided with a dam or apron extending at right angles across their free ends and arranged to leave a circular axial space at the center of said ore-roasting cylinder, substantially as described.

7. In an ore-roasting furnace, the combination with a combustion-chamber and a smoke-stack, of a flue-cylinder rotatably mounted and operatively connected to said combustion-chamber and said smoke-stack, an ore-roasting cylinder secured within said flue-cylinder to form a flue between the same, a plurality of shelves projecting tangentially inward from the inner periphery of said ore-roasting cylinder and extending through it and arranged to form a clear space at the axial center of said cylinder, and a plurality of partition, blades on one side of each shelf arranged to stand at a transverse angular pitch to said shelves and to the longitudinal axis of said ore-roasting cylinder, and a dam across the end of each shelf, substantially as described.

8. In an ore-roasting furnace, the combination of the combustion-chamber and the smoke-stack with the flue-cylinder rotatably mounted, the ore-roasting cylinder within the flue-cylinder, shelves on the inner periphery of said ore-roasting cylinder for feeding the ore through said cylinder and rabbling the same and a central space in said ore-roasting cylinder within said shelves, substantially as described.

9. In an ore-roasting furnace, the combination with the combustion-chamber and the smoke-stack, of the flue-cylinder rotatably mounted, means for rotating said cylinder, an ore-roasting cylinder within said flue-cylinder provided with pockets on its inner periphery arranged to scoop up and feed the ore forward through said cylinder as said cylinder rotates, the plurality of curved feed-spouts at one end of said ore-roasting cylinder, and means for discharging the ore from the opposite end of said ore-roasting cylinder, substantially as described.

10. In an ore-roasting furnace, the combination of the combustion-chamber, the smoke-stack, and the flue-cylinder rotatably mounted and operatively connected with said combustion-chamber and stack, of an ore-roasting cylinder in said flue-cylinder arranged to project through said stack, a hopper at the end of said ore-roasting furnace and a plurality of curved spouts attached to the end of said ore-roasting furnace and arranged to scoop up ore from said hopper and discharge it into the end of said ore-roasting furnace, substantially as described.

11. In an ore-roasting furnace, the combination of the combustion-chamber, the smoke-stack, the flue-cylinder, the ore-roasting cylinder with the curved spouts at the feed end of said furnace having one of their ends entering the central portion of the end of said ore-roasting cylinder and their opposite ends arranged to receive ore and discharge it into the feed end of said ore-roasting cylinder, substantially as described.

12. In an ore-roasting furnace, the combination with the flue and ore-roasting cylinders, of the air-pipes extending into the opposite ends of said ore-roasting cylinder, and a plurality of curved spouts arranged with one of their ends extending into the ore-feed end of said furnace and their opposite ends arranged to receive ore and deliver it through their opposite ends into said ore-roasting furnace, substantially as described.

13. In an ore-roasting furnace, the combination with the ore-roasting cylinder of the curved semicircular-shaped spouts having one of their ends extending into the feed end of said cylinder and having their opposite ends arranged to receive ore as they rotate and discharge it into the feed end of said ore-roasting cylinder, substantially as described.

14. In an ore-roasting furnace, an operative, rotatable ore-roasting cylinder and a curved spout arranged at its ore-feeding end adapted to receive and discharge ore into the feed end of said ore-roasting cylinder, substantially as described.

15. In an ore-roasting furnace, a revoluble ore-roasting cylinder having a substantially closed end, a curved feed-spout opening through said end, and a hopper in position to receive said spout, substantially as described.

16. In an ore-roasting furnace, a revoluble ore-roasting cylinder having a substantially closed end, a plurality of curved feed-spouts opening through said end, and a hopper in position to receive said spouts, substantially as described.

17. In an ore-roasting furnace, an operative rotatable ore-roasting cylinder having an ore-feeding end, a head in said end, an air or steam pipe extending through said head and a plurality of curved spouts secured to said head end and having one of their ends extending through said head and adjacent to said pipe and arranged and adapted to receive ore and deliver it through said head into said ore-roasting cylinder, substantially as described.

18. In an ore-roasting furnace, the combination with the flue-cylinder rotatably mounted and provided with a combustion-chamber at one end and a smoke-stack at its opposite end, of an ore-roasting cylinder of smaller diameter secured within said flue-cylinder and projecting through said combustion-chamber and said smoke-stack, a head in the feed end of said ore-roasting cylinder, an air or steam pipe extending through said head, an ore-hopper at the feed end of said ore-roasting cylinder and a plurality of semicircular-shaped curved spouts arranged in a circle around said head, and having their inner ends extending into apertures formed in the head of said ore-roasting furnace, and their opposite ends arranged to rotate in said hopper, substantially as described.

19. In an ore-roasting furnace, the combination of an ore-roasting, rotating cylinder having a curved spout attached to one end arranged to scoop up ore at one end and to discharge the ore through its opposite end into said ore-roasting cylinder, substantially as described.

20. In an ore-roasting furnace, the combination of an ore-roasting cylinder rotatably mounted, having a plurality of tangentially-projecting shelves on its inner periphery and a plurality of plates spaced at a short distance apart on one side of said shelves and standing at an angle to the transverse plane of said cylinder and in an inclined plane to the longitudinal axis of said cylinder adapted to form a plurality of ore-holding pockets on said shelves and an apron across the ends of said shelves, substantially as described.

21. In an ore-roasting furnace the combination of a rotatable flue-cylinder with an ore-roasting cylinder of smaller diameter, radial arms on said ore-roasting cylinder extending to the inner periphery of said flue-cylinder, a shoulder at each end of said flue-cylinder against which the said arms abut and a screw-bolt extending loosely through the shell of said flue-cylinder and screwing into the arms of said ore-roasting cylinder, substantially as described.

22. In an ore-roasting furnace, the combination with the combustion-chamber and the smoke-stack, of a rotatable cylinder connected to said combustion-chamber and said stack and divided into sections, a cylinder of smaller diameter supported axially within said cylinder also divided into sections of substantially equal lengths, and arranged to leave an annular flue-space between the periphery of said inner cylinder and the inner periphery of said outer cylinder, means including arms extending from each section of said inner cylinder to the inner periphery of each section of said outer cylinder for securing said cylinders together, an annular recess in one end of each section of said inner cylinder, a projecting ring portion on the opposite end of each section of said inner cylinder registering with the one edge of said recessed portion of the opposite end of each section of said inner cylinder and a ring arranged to fit in the recess of one section and inside of the ring of another section, and flanges on the ends of said outer cylinder arranged and adapted to be clamped together, substantially as described.

23. In an ore-roasting furnace, a revoluble flue-cylinder, an ore-roasting cylinder within said flue-cylinder, said flue-cylinder having a flaring end, and a combustion-chamber receiving said flaring end, substantially as described.

24. In an ore-roasting furnace, a revoluble flue-cylinder, an ore-roasting cylinder within said flue-cylinder, said flue-cylinder having a flaring end, and a combustion-chamber having an arch-supporting ring and receiving the flaring end of said flue-cylinder, substantially as described.

25. In an ore-roasting furnace, the combination with a combustion-chamber, of a flue-cylinder rotatably mounted and connected at one end with said combustion-chamber by an end section of diverging conical shape, a smoke-stack at the opposite end of said flue-cylinder, an ore-roasting cylinder secured within said flue-cylinder and extending through said smoke-stack at one end, means for feeding ore into the smoke-stack end of said ore-roasting cylinder and having its discharge end extend beyond the combustion-chamber end of said flue-cylinder and through said combustion-chamber and having the discharge end section of said ore-roasting furnace of greater diameter than the remainder of said ore-roasting cylinder within said flue-cylinder and having said enlarged ore-discharge end portion increase in diameter within the diverging conical end of said flue-cylinder, means including apertures in the free end of the enlarged end portion for discharging ore from said ore-roasting cylinder, substantially as described.

26. In an ore-roasting furnace the combination of the combustion-chamber, the smoke-stack and the rotatable, mounted flue-cylinder having an enlarged diverging conical end projecting into the adjacent end of said combustion-chamber, with an ore-roasting cylinder secured within said flue-cylinder and provided with an ore-discharge end portion of larger diameter than that portion that extends through said flue-cylinder and extending from the interior of said diverging conical end portion of said flue-cylinder through and beyond said combustion-chamber, means for feeding ore into said ore-roasting cylinder, means for discharging ore from said enlarged end portion of said ore-roasting cylinder and means for introducing air or steam into said ore-roasting cylinder, substantially as described.

27. In an ore-roasting furnace, the combination of the flue-cylinder rotatably mounted and having a diverging conical end portion at one end, a combustion-chamber connected to the conical end of said flue-cylinder, and a smoke-stack at the opposite end of said flue-cylinder, with an ore-roasting cylinder secured within said flue-cylinder and extending beyond it at both ends and through said smoke-stack and combustion-chamber and arranged to provide a flue-space between it and said flue-cylinder, means including curved spouts for feeding ore into the ore-discharge apertures in the shell of the end of said ore-roasting cylinder that projects beyond said combustion-chamber, and a supply of suitable fluid-oxidizing material, substantially as described.

28. In an ore-roasting furnace, a revoluble ore-roasting cylinder, a pipe having an end extending axially into said cylinder, and a conical hood the flaring mouth of which faces said end, substantially as described.

29. In an ore-roasting furnace, the combination with the flue-cylinder, of the ore-roasting cylinder within said flue-cylinder, means for feeding ore into one end of said ore-roasting cylinder, apertures in the opposite end for discharging ore from said ore-roasting cylinder, a head in the ore-discharge end of said ore-roasting cylinder, a pipe extending through said head and extending axially into said ore-roasting cylinder a predetermined distance, a conical hood on the end of said pipe and arranged with the interior of the hood extending at a short distance beyond the end of said pipe and diverging back over the end of said pipe, and an air or steam pipe coupled to the outer end of the aforesaid pipe, and extending into and through said combustion-chamber, and operatively connected to a source of air or steam, substantially as described.

30. In an ore-roasting furnace, the combination with the flue-cylinder and the combustion-chamber at one end of said flue-cylinder, of an ore-roasting cylinder within said flue-cylinder and projecting beyond it through and beyond said combustion-chamber and having a head end at its discharge end, ore-discharging apertures in the shell of the end of said ore-roasting cylinder, a hood surrounding the discharge-apertures at the discharge end of said ore-roasting cylinder provided with a fume-stack at its top end and a discharge-chute at its bottom, a hub projecting from said head, a journal-box yieldingly mounted on said hub, an aperture through said hub, an air or steam inlet pipe operatively coupled to said hub and projecting loosely through said hub and into the discharge end of said ore-roasting cylinder a predetermined distance, and a conical hood operatively secured to the inner end of said pipe and arranged and adapted to deflect the discharging air or steam from said pipe backward through the discharge end portion of said ore-roasting cylinder, substantially as described.

31. In an ore-roasting furnace, the combination of the flue-cylinder, the combustion-chamber, the smoke-stack and the ore-roasting cylinder projecting through said flue-cylinder, smoke-stack and combustion-chamber, a plurality of spirally-curved spouts secured to the smoke-stack end of said ore-roasting cylinder arranged to scoop up and feed ore into the end of said ore-roasting cylinder as it rotates, ore-discharge apertures at the opposite end of said ore-roasting cylinder, means including a pipe coupled to the discharge end of said furnace and extending into and through said combustion-chamber to a source of supply for introducing hot air or steam or superheated steam into the discharge end of said ore-roasting cylinder, means including a pipe for introducing air into the ore-feeding end of said ore-roasting cylinder, means for rotating said cylinders and means for automatically feeding ore through said cylinder and for automatically rabbling it as it feeds through said ore-roasting cylinder, substantially as described.

32. In an ore-roasting cylinder, the combination with the flue-cylinder, of rollers mounted to rotatably support said cylinder having journal-bearings pivotally connected together intermediate of said rollers and below said cylinder, a supporting-base below the pivoted bearings of said rollers and springs arranged between said base-plate and said bearings arranged to yieldingly support said cylinder, substantially as described.

33. In an ore-roasting furnace, a revoluble ore-roasting cylinder, a base-plate, support-rollers mounted in boxes which are free to shift on said plate, and roller-adjusting means connecting said boxes, substantially as described.

34. In an ore-roasting furnace, a revoluble ore-roasting cylinder, a base-plate, three support-rollers mounted in boxes which are free to shift on said plate, and roller-adjusting means connecting said boxes, substantially as described.

35. In an ore-roasting furnace, a revoluble ore-roasting cylinder, three support-rollers beneath said cylinder, each roller mounted in a movable box, and adjusting-rods connecting said boxes, substantially as described.

36. In an ore-roasting furnace, the combination with the rotatable flue-cylinder of roller-bearings under the end portions of said cylinder comprising three rollers slidably mounted transversely of said cylinder, the center one of which is positioned below the vertical center of said cylinder, suitable boxes in which said rollers are rotatably mounted, a suitable base-block provided with grooves in which said boxes are slidably mounted, bolts extending through the boxes of the outside rollers having threaded ends and nuts arranged to adjust said rollers and boxes toward or away from each other and bolts extending from the center roller's supporting-box through the boxes of the end rollers and arranged and adapted to adjust the three boxes and their rollers relatively to each other, substantially as described.

37. In an ore-roasting furnace, a revoluble ore-roasting cylinder, means for supporting the ends of said cylinder, and a resilient cylinder-support between said end supports substantially as described.

38. In an ore-roasting furnace, a revoluble ore-roasting cylinder, rollers beneath each end of said cylinder, and resilient support-rollers between said end rollers, substantially as described.

39. In an ore-roasting furnace, a cylinder rotatably mounted, roller-bearings under each end of said furnace, the rollers of each bearing of which are arranged to be transversely adjustable to and from each other, and a resiliently-yielding roller-bearing under the center of the furnace, substantially as described.

40. In an ore-roasting furnace, a revoluble ore-roasting cylinder, and a combustion-chamber having a conical arch-supporting ring and receiving the end of said cylinder, substantially as described.

41. In an ore-roasting furnace, the combination with the combustion-chamber, of the flue-cylinder provided with a diverging conical end portion projecting into said combustion-chamber, an arch-ring in the wall of said combustion-chamber surrounding the conical end of said cylinder and a conical ring in the wall of said combustion-chamber at the side of said arch-ring diverging outwardly toward the interior of said combustion-chamber and adapted to form a flaring entrance for the products of combustion from said combustion-chamber into said cylinder, substantially as described.

42. In an ore-roasting furnace, the combination of an ore-roasting cylinder rotatably mounted, having a plurality of projecting shelves on its inner periphery, each shelf having a dam extending across its edge, substantially as described 43. In an ore-roasting furnace, the combination of an ore-roasting cylinder rotatably mounted, having a plurality of projecting shelves on its inner periphery, each shelf having a dam extending across its edge, and a plurality of partition-plates spaced at a short distance apart on one side of shelves arranged to stand at an angle to the transverse plane of said cylinder and in a spiral plane to the longitudinal axis of said cylinder, and arranged and adapted to form a plurality of ore-holding pockets on said shelves, substantially as described.

In testimony whereof I affix my signature in presence of two witnesses.

CHRISTOPHER C. WILSON.

Witnesses:
G. SARGENT ELLIOTT,
JOHN E. WIGHTMAN.